US006952475B1

(12) United States Patent
Horn et al.

(10) Patent No.: US 6,952,475 B1
(45) Date of Patent: Oct. 4, 2005

(54) METHOD AND ARRANGEMENT FOR THE COMPUTER-AIDED EXCHANGE OF CRYPTOGRAPHIC KEYS BETWEEN A FIRST COMPUTER UNIT AND A SECOND COMPUTER UNIT

(75) Inventors: Guenther Horn, Munich (DE); Volker Kessler, Gummersbach (DE); Klaus Mueller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/700,928

(22) PCT Filed: May 6, 1999

(86) PCT No.: PCT/DE99/01365

§ 371 (c)(1),
(2), (4) Date: Mar. 29, 2001

(87) PCT Pub. No.: WO99/60747

PCT Pub. Date: Nov. 25, 1999

(30) Foreign Application Priority Data

May 20, 1998 (DE) ................................ 198 22 795

(51) Int. Cl.[7] ............................. H04K 1/00; H04L 9/00
(52) U.S. Cl. ..................................................... 380/30
(58) Field of Search ........................... 380/30, 285, 40; 713/171, 151

(56) References Cited

U.S. PATENT DOCUMENTS

| 5,153,919 A | 10/1992 | Reeds, III et al. | |
| 5,214,700 A | 5/1993 | Pinkas et al. | |
| 5,222,140 A * | 6/1993 | Beller et al. ................... | 380/30 |
| 5,515,441 A * | 5/1996 | Faucher ........................ | 380/30 |
| 6,064,741 A * | 5/2000 | Horn et al. .................. | 380/285 |
| 6,526,509 B1 * | 2/2003 | Horn et al. .................. | 713/171 |
| 6,539,479 B1 * | 3/2003 | Wu ............................. | 713/151 |

FOREIGN PATENT DOCUMENTS

| DE | 195 14 084 C1 | 7/1996 |
| DE | 195 18 544 C1 | 8/1996 |
| DE | 195 18 546 C1 | 8/1996 |
| EP | 0 661 844 A2 | 7/1995 |
| WO | 96/37064 | 11/1996 |

OTHER PUBLICATIONS

Ashar Aziz et al. "Privacy and Authentication for Wireless Local Area Networks", IEEE Personal Communications, First Quarter 1994, pp. 25-31.

Mike Beller: "Proposed Authentication and Key Agreement Protocol for PCS", Joint Experts Meeting on Privacy and Authentication for personal Communications, P&A JEM 1993, pp. 1-11.

(Continued)

Primary Examiner—Ayaz Sheikh
Assistant Examiner—A. Sherkat
(74) Attorney, Agent, or Firm—Laurence A. Greenberg; Werner H. Stemer; Ralph E. Locher

(57) ABSTRACT

The invention relates to a method which can be used to declare a session key (K) between a first computer unit (U) and a second computer unit (N) without it being possible for an unauthorized third party to obtain useful information regarding the keys or the identity of the first computer unit (U). This is achieved by embedding the principle of El-Gamal key interchange in the method with additional formation of a digital signature using a hash value whose input variable contains at least variables which can be used to infer the session key unambiguously.

77 Claims, 6 Drawing Sheets

OTHER PUBLICATIONS

Chris Carrol et al.: "Efficient key distribution for slow computing devices: Achieving fast over the air activation for wireless systems", IEEE Conference Security & Privacy, Oakland 1998, pp. 66-76.

J. Zhou et al.: "Undeniable billing in mobile communications", Fourth Annual ACM/IEEE International Conference on Mobile Computing and Networking, Oct. 25-30, 1998, Dallas, TX, pp. 284-290.

Michael J. Beller et al.: "Privacy and Authentication on a Portable Communications System", IEEE Journal on Selected Areas in Communications, vol. 11, No. 6, Aug. 1993, pp. 821-829.

Whitfield Diffie et al.: "Authentication and Authenticated Key Exchanges", Designs, Codes and Cryptography, vol. 2, 1992, pp. 107-125.

* cited by examiner

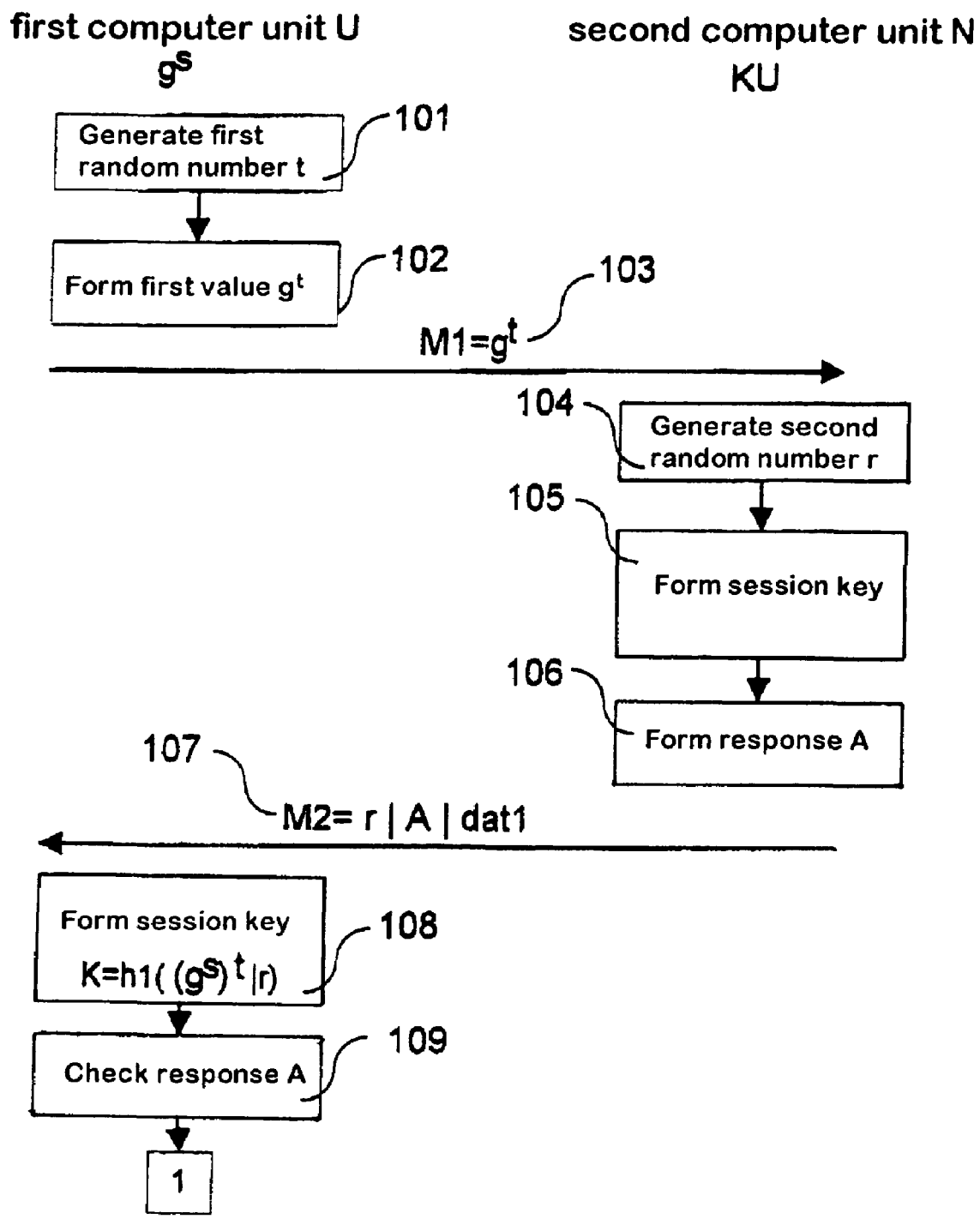

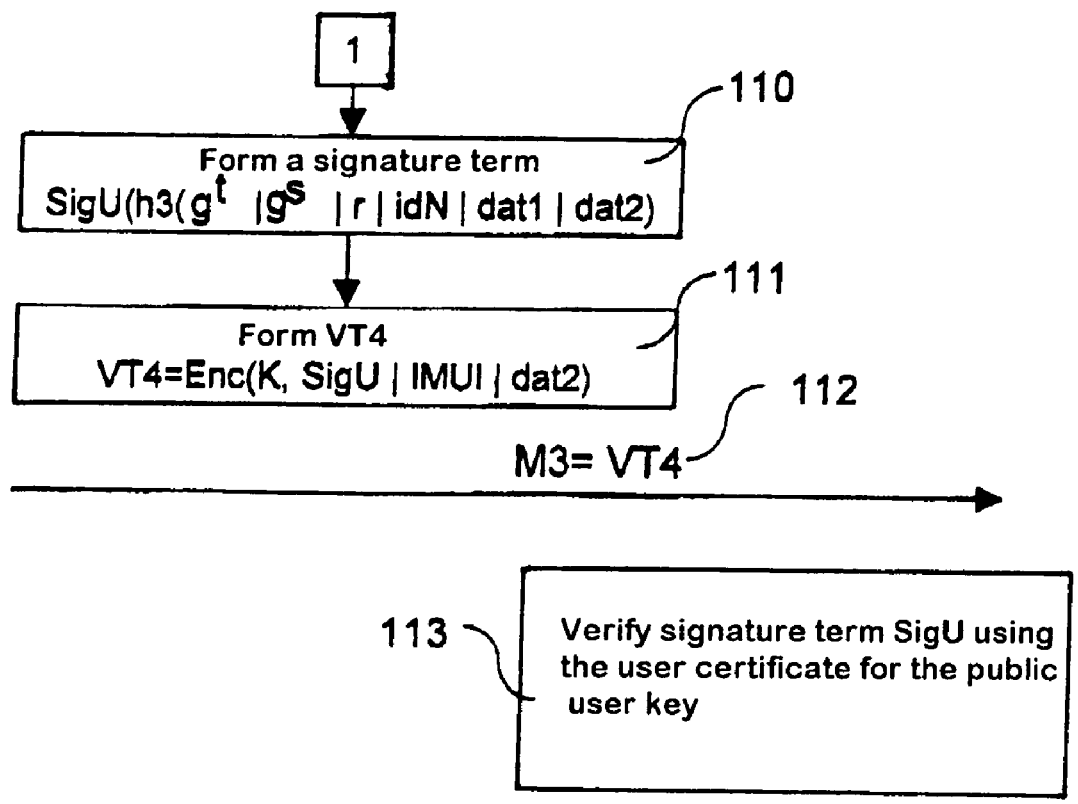

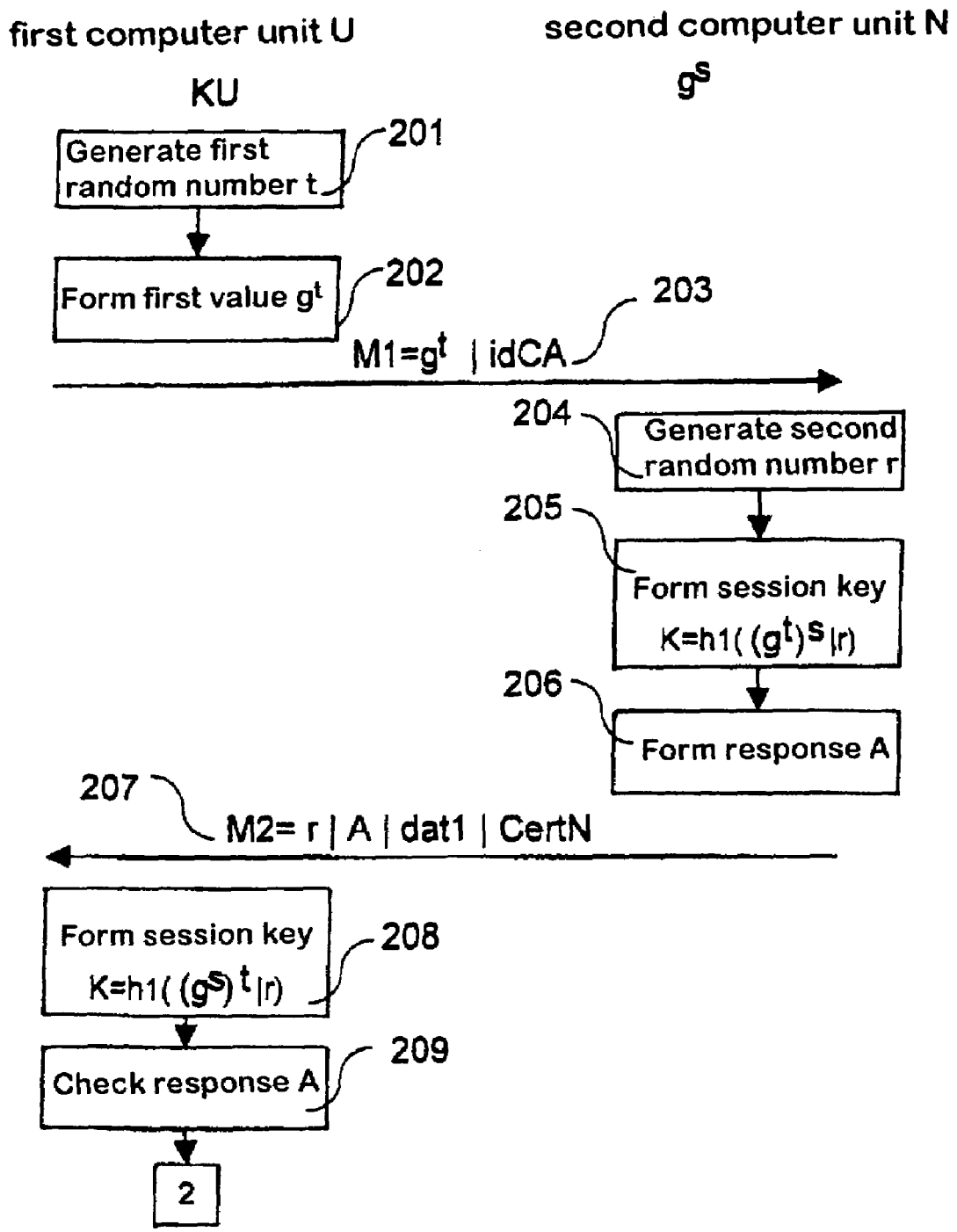

METHOD AND ARRANGEMENT FOR THE COMPUTER-AIDED EXCHANGE OF CRYPTOGRAPHIC KEYS BETWEEN A FIRST COMPUTER UNIT AND A SECOND COMPUTER UNIT

BACKGROUND OF THE INVENTION

Field of the Invention

The invention relates to the computer-aided interchange of cryptographic keys between a first computer unit and a second computer unit.

Information technology systems are subject to various threats. Thus, by way of example, transmitted information can be tapped and modified by an unauthorized third party. A further threat during communication between two communication parties is that of a false identity of one communication party being feigned.

These and other threats are countered by various security mechanisms which are intended to protect the information technology system from the threats. One security mechanism used for safeguarding purposes is encryption of the transmitted data. To be able to encrypt the data in a communication link between two communication parties, steps which prepare the encryption first need to be taken before the actual data is transmitted. By way of example, the steps may involve the two communication parties agreeing to an encryption algorithm and, if appropriate, the common secret keys being declared.

The encryption security mechanism takes on particular significance in the case of mobile radio systems, since the transmitted data in these systems can be tapped by any third party without any particular additional effort.

This leads to the requirement for known security mechanisms to be selected and these security mechanisms to be suitably combined, and also for communication protocols to be specified, such that they ensure the security of information technology systems.

Various asymmetric methods for the computer-aided interchange of cryptographic keys are known.

Asymmetric methods which are suitable for mobile radio systems are described in [1], [2], [3] and [4].

The method described in [1] relates expressly to local area networks and makes relatively high demands in terms of computing power on a computer unit of a communication party during the key interchange. Moreover, more transmission capacity is required in the method than in the method according to the invention, since the length of the messages is greater than in the case of the invention.

The method described in [2] has not implemented a few fundamental security aims. Explicit authentication of the network by the user is not achieved. Moreover, a key transmitted to the network by the user is not confirmed to the user by the network. There is also no assurance for the network that the key is fresh (up to date). A further disadvantage of this method is the restriction to the Rabin method in the implicit authentication of the key by the user. This restricts the method in terms of more flexible applicability. In addition, no security mechanism which ensures the incontestability of transmitted data is provided. This is a considerable disadvantage, in particular also for the preparation of incontestable charge accounts for a mobile radio system. The restriction of the method to the signature function used being the National Institute of Standards in Technology Signature Standard (NIST DSS) also restricts the method in its general applicability.

The method described in [3] has not implemented a fundamental security aim: explicit authentication of the user by the network is not achieved.

The method described in [4] is based on the assumption of the existence of common secret keys both between the user and the visited network and between the user and the home network before a protocol pass starts. This assumption is too restrictive for many instances of use.

In addition, [5] discloses a method for secure data interchange between a multiplicity of subscribers involving a certification authority: The protocol used for this method has a random number, an identity statement and also a public key and a session key. However, fundamental security aims are not implemented in this method.

In addition, [6] discloses a method for PC—PC communication involving a trust center.

[7] discloses a method in which a session key is produced using both a public key and a secret key and also using a random number. This session key is combined with a public key.

In addition, [8] describes a method in which a user unit identifies itself to a network unit. An authentication process then takes place between the user unit and the network unit using a hash function.

[9] discloses further secure communication protocols which nevertheless do not implement important fundamental security aims.

[10] discloses the practice of forming a first value in a first computer unit from a first random number using a generating element of a finite group, and transmitting it to a second computer unit. In the second computer unit, a session key is formed by hash value formation for the first value, which is exponentiated using a secret network key. The session key is likewise formed in the first computer unit, but there by hash value formation for a public network key which is exponentiated using the first random number. In addition, a hash value for the session key is formed there and the hash value is digitally signed. The resultant signature term is transmitted to the second computer unit and is verified there.

The method described in [11] achieves the important security aims, but with a relatively high level of input in terms of computing power and transmission capacity.

Asymmetric methods are essentially based on two complexity theory problems, the problem of efficiently factorizing composed numbers and the discrete logarithm problem (DLP). The DLP is that, although exponentiation operations can be carried out efficiently in suitable computing structures, no efficient algorithms are known for the reversal of this operation, logarithmation.

By way of example, the finite groups referred to above are to be understood as being such computing structures. These groups are, for example, the multiplicative group of a finite body (e.g. multiplication modulo p, where p is a large prime number), or else so-called "elliptical curves". Elliptical curves are primarily of interest because they permit much shorter security parameters for the same level of security. This relates to the length of the public keys, to the length of the certificates, to the length of the messages to be interchanged during session key declaration and to the length of digital signatures, which are each described below. The reason for this is that the logarithmation methods known for elliptical curves are much less efficient than those for finite bodies.

In this context, a large prime number means that the size of the prime number needs to be selected such that logarithmation is so complex that it cannot be performed in a reasonable time. In this context, reasonable means a period of time corresponding to the security policy over a number of years to decades, and longer.

In this context, a hash function is to be understood as being a function in the case of which it is not possible to calculate a matching input value for a given function value. In addition, an input character sequence of arbitrary length is allocated an output character sequence of fixed length. Furthermore, additional properties may be demanded for the hash function. One such additional property is freedom from conflict, i.e. it must not be possible to find two different input character sequences which produce the same output character sequence.

SUMMARY OF THE INVENTION

The invention is based on the problem of specifying a simplified method for the computer-aided interchange of cryptographic keys which does not presuppose the existence of common secret keys.

In the method, a first value is formed from a first random number using a generating element of a finite group in the first computer unit. A first message is transmitted from the first computer unit to the second computer unit, the first message containing at least the first value. A session key is formed in the second computer unit using a first hash function, a first input variable for the first hash function containing at least one first term which is formed by exponentiation of the first value using a secret network key. The session key is formed in the first computer unit using the first hash function, a second input variable for the first hash function containing at least one second term which is formed by exponentiation of a public network key using the first random number. A fourth input variable is formed in the first computer unit using a second hash function or the first hash function, a third input variable for the first hash function or for the second hash function containing, for the purpose of forming the fourth input variable, one or more variables which can be used to infer the session key unambiguously. A signature term is formed in the first computer unit from at least the fourth input variable using a first signature function. A third message is transmitted from the first computer unit to the second computer unit, the third message containing at least the signature term from the first computer unit. The signature term is verified in the second computer unit.

In the case of the arrangement, the first computer unit and the second computer unit are set up such that the following method steps can be carried out:
- a first value is formed from a first random number using a generating element of a finite group in the first computer unit,
- a first message is transmitted from the first computer unit to the second computer unit, the first message containing at least the first value,
- a session key is formed in the second computer unit using a first hash function, a first input variable for the first hash function containing at least one first term which is formed by exponentiation of the first value using a secret network key,
- the session key is formed in the first computer unit using the first hash function, a second input variable for the first hash function containing at least one second term which is formed by exponentiation of a public network key using the first random number,
- a fourth input variable is formed in the first computer unit using a second hash function or the first hash function, a third input variable for the first hash function or for the second hash function containing, for the purpose of forming the fourth input variable, one or more variables which can be used to infer the session key unambiguously,
- a signature term is formed in the first computer unit from at least the fourth input variable using a first signature function,
- a third message is transmitted from the first computer unit to the second computer unit, the third message containing at least the signature term from the first computer unit, and
- the signature term is verified in the second computer unit.

The advantages which are achieved by the invention are primarily a considerable reduction in the length of the transmitted messages and the implementation of further security aims.

In addition, the invention can be adapted very easily to different requirements, since there is no restriction to particular algorithms for signature formation and encryption.

In one development, provision is made for a long-service secret network key and a long-service public network key to be used.

A long-service key is to be understood below as being a key which is used for a plurality of protocol passes.

The invention and its developments implement the following security aims:
- mutual explicit authentication by the user and the network, i.e. mutual verification of the claimed identity,
- key declaration between the user and the network with mutual implicit authentication, i.e. the method achieves the effect that, after completion of the procedure, a common secret session key is available, of which each party knows that only the authentic counterpart can likewise be in possession of the secret session key,
- assurance for the user that the session key is fresh (up to date),
- mutual confirmation of the session key by the user and the network, i.e. confirmation that the counterpart is actually in possession of the declared secret session key.

The following advantageous developments of the method also relate to these security aims.

In one development, a dependable public user key for the first computer unit, e.g. in the form of a user certificate, is additionally made available in the first computer unit and a dependable public network key for the second computer unit, e.g. in the form of a network certificate, is made available in the second computer unit. The public network key need not be available in the first computer unit in this development.

In a further refinement, it is not necessary for the public user key to be available in the second computer unit.

In accordance with a further refinement, no dependable public network key for the second computer unit is necessary in the first computer unit. A dependable public certification key for the certification computer unit is available in the first computer unit. This means that the first computer unit needs to "acquire" the dependable public network key in the form of a network certificate from a certification computer unit. The second computer unit likewise needs the dependable public user key in the form of a user certificate from the certification computer unit.

The developments of the invention in accordance with patent claims 13, 15 and 20 implement the security aim of user anonymity, i.e. confidentiality of the identity of the user with regard to third parties.

The development of the method according to the invention in accordance with patent claim 15 permits the use of temporary user identities.

The development of the method in accordance with patent claim 16 primarily ensures additional authentication of the second computer unit with regard to the first computer unit.

The development in accordance with patent claim 18 implements the security aim of assurance for the network that the session key is fresh (up to date).

The development in accordance with patent claim 21 additionally implements the security aim of incontestability of data which has been sent from the user to the network.

The drawings show preferred exemplary embodiments of the invention which are described in more detail below.

BRIEF DESCRIPTION OF THE DRAWINGS

FIGS. 1A and 1B show a flowchart illustrating a first exemplary embodiment of the method with a few developments;

FIGS. 2A and 2B show a flowchart illustrating a second exemplary embodiment of the method with a few developments.

DESCRIPTION OF THE PREFERRED EMBODIMENT

First Exemplary Embodiment

Figure 2B:
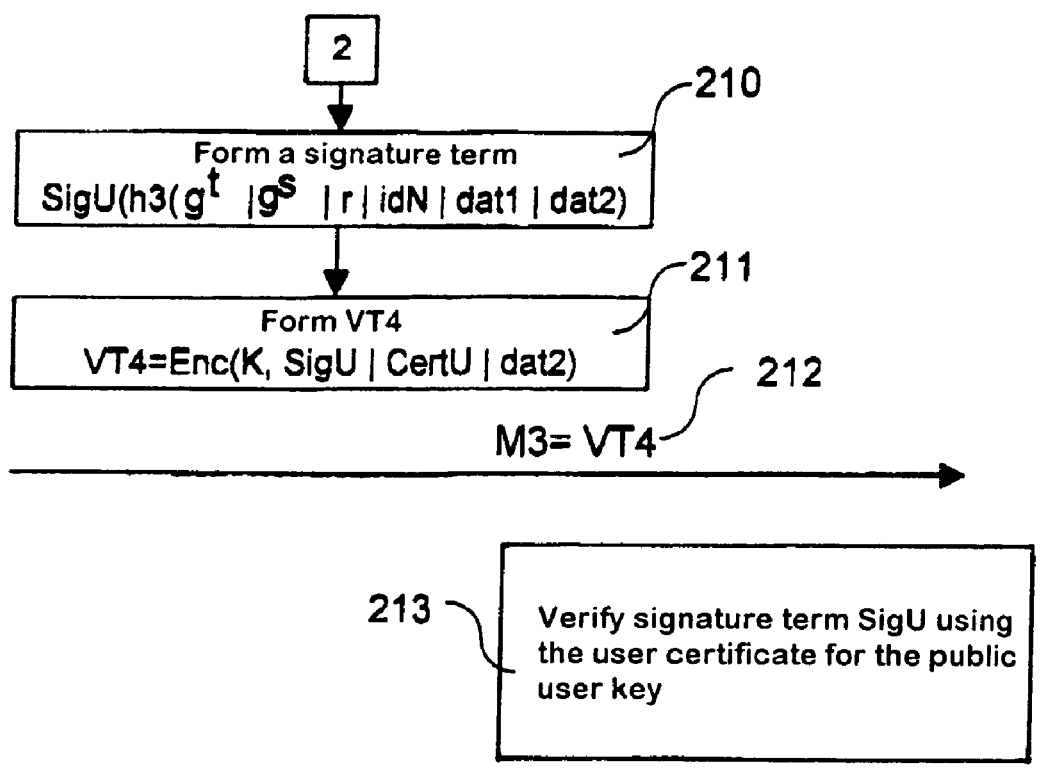

FIGS. 1A and 1B show a sketch of the execution of the method. The method relates to the interchange of cryptographic keys between a first computer unit U and a second computer unit N, where the first computer unit U is to be understood as being a computer unit of a user of a mobile radio network and a second computer unit N is to be understood as being a computer unit of the network operator of a mobile radio system.

It is a prerequisite for the method that a dependable public network key $g^s$ for the second computer unit N is available in the first computer unit U and that a dependable public user key KU for the first computer unit U is available in the second computer unit N, where g is a generating element of a finite group.

In the first computer unit U, a first random number t is generated (step 101). The generating element g of a finite group is used to form a first value $g^t$ from the first random number t in the first computer unit U (step 102).

Once the first value $g^t$ has been calculated, a first message M1, containing at least the first value $g^t$, is coded. The first message M1 is transmitted from the first computer unit U to the second computer unit N (step 103).

In the second computer unit N, the first message M1 is decoded. The first message M1 may also be transmitted over an insecure channel, that is to say also via an air interface, in unencrypted form, since the logarithmation of the first value $g^t$ cannot be performed in a reasonable time.

In the second computer unit N, a second random number r is generated (step 104). This additional method step implements an additional security aim: the assurance for the second computer unit N that a session key K described below is fresh (up to date).

In the second computer unit N, a first hash function h1 is used to form a session key K (step 105). At least one first term is used as a first input variable for the first hash function h1. The first term is formed by raising the first value $g^t$ to a higher power using a secret network key s.

If the second random number r is used, the first input variable for the first hash function h1 additionally contains at least the second random number r.

A response A is now formed in the second computer unit N (step 106). Various variants are provided for forming the response A. Thus, for example, it is possible for an encryption function Enc to be used to encrypt a constant const, and possibly further variables, with the session key K. The constant const is known both to the first computer unit U and to the second computer unit N. The encryption function Enc is also known both to the second computer unit N and to the first computer unit U as the encryption function which is to be used in the method.

A further option for forming the response A (step 106) is for the session key K, and possibly prescribable further variables, e.g. an identity statement idN for the second computer unit N and/or the second random number, to be used as input variable for a second hash function h2, and for the "hashed" value for the session key K, and possibly for the further variables, to be used as response A.

Stringing together the second random number r, the response A and also an optional first data field dat1 forms a second message M2. The optional first data field dat1 is only contained in the second message M2 if this is provided in the method.

The second message M2 is coded in the second computer unit N and is transmitted to the first computer unit U (step 107).

In the first computer unit U, the second message M2 is decoded, which means that the first computer unit U has the second random number r, the response A and possibly the optional first data field dat1 available. The length of the optional first data field dat1 may be of any desired size, i.e. it is also possible for the optional first data field dat1 not to be present.

In the first computer unit U, the session key K is now likewise formed (step 108), using the first hash function h1, which is known both to the second computer unit N and to the first computer unit U. A second input variable for the first hash function h1 for forming the session key K in the first computer unit U contains at least one second term. The second term is formed from exponentiation of a public network key $g^s$ using the first random number t. If the use of the second random number r is provided in the method for calculating the session key K, the second input variable for the first hash function h1 for forming the session key K in the first computer unit U additionally contains the second random number r.

The use of the first random number t and of the second random number r for generating the session key K ensures that the session key K is up to date, since the first random number t and the second random number r are respectively used only for one session key K in each case. This prevents reinjection of an older key as the session key K.

Once the session key K has been formed in the first computer unit U, the received response A is used to check whether the session key K formed in the first computer unit U matches the session key K which was formed in the second computer unit N (step 109). Subject to the variants described above for forming the response A, various options are provided for checking the session key K using the response A.

One option is that, if the response A has been formed in the second computer unit N by encrypting the constant const, and possibly further variables, with the session key K using the encryption function Enc, the response A is decrypted, and hence the first computer unit U receives a decrypted constant const', and possibly prescribable further variables, which is/are compared with the known constant const, and possibly the further variables.

The session key K may also be checked, using the response A, by encrypting the constant const, known to the first computer unit U, and possibly prescribable further variables, with the session key K, formed in the first computer unit U, using the encryption function Enc and checking the result with the response A for a match. This procedure is also used when the response A is formed in the second computer unit N, by applying the second hash function h2 to the session key K, and possibly to the further variables. In this case, the session key K formed in the first computer unit U, and possibly prescribable further variables, is/are used as input variable for the second hash function h2 in the first computer unit U. The "hashed" value for the session key K formed in the first computer unit U, and possibly for further variables, is then checked with the response A for a match. This achieves the aim of key confirmation for the session key K.

As a result of the secret network key s being used for calculating the session key K in the second computer unit N, and the public network key $g^s$ being used for calculating the session key K in the first computer unit U, the second computer unit N is authenticated by the first computer unit U. This is achieved provided that it is known for the first computer unit U that the public network key $g^s$ actually belongs to the second computer unit N.

Subsequent to confirmation of the session key K by means of a check on the response A, a signature term is calculated (step 110). To this end, a third hash function h3 is used to form a fourth input variable. The third hash function h3 can, but need not, be the same hash function as the first hash function h1 and/or the second hash function h2. As a third input variable for the third hash function h3, a term is used which contains one or more variables from which it is possible to infer the session key unambiguously. In addition, the third input variable may contain the optional first data field dat1 or else an optional second data field dat2, if the use thereof is provided in the method.

Such variables are the first value $g^r$, the public network key $g^s$ and the second random number r.

It is subsequently not possible to contest the fact that the data contained in the first optional data field dat1 and in the second optional data field dat2 has been sent from the first computer unit U.

The data contained in the first optional data field dat1 and in the second optional data field dat2 may be telephone numbers, the current time or similar parameters suitable for this purpose. This information may be used as a tool for incontestable charge accounting.

A first signature function $Sig_u$, is used to form the signature term from at least the fourth input variable. To achieve a higher degree of security, the signature term may be encrypted. In this case, the signature term is encrypted with the session key K using the encryption function Enc and forms the first encrypted term VT1.

In addition, if the security aim of "anonymity of the user" is to be implemented, a second encrypted term VT2 is calculated by encrypting an identity variable IMUI for the first computer unit U with the session key K using the encryption function Enc. When an optional second data field dat2 is used, a third encrypted term VT3 is calculated in the first computer unit U by encrypting the optional second data field dat2 with the session key K using the encryption function Enc; the optional second data field dat2 may also be transmitted in unencrypted form.

The three encrypted terms may also be combined to form a fourth encrypted term VT4, in which the interlinkage of signature term, identity variable IMUI and optional second data field dat2 is encrypted with the session key K (step 111).

In the first computer unit U, a third message M3, containing at least the signature term and the identity variable IMUI for the first computer unit U, is formed and coded.

If anonymity of the first computer unit U is to be ensured, the third message M3 contains, instead of the identity variable IMUI for the first computer unit U, at least either the second encrypted term VT2 or the fourth encrypted term VT4, which contains the information about the identity of the first computer unit U in encrypted form, which can be decrypted only by the second computer unit N.

If the use of the optional second data field dat2 is provided, the third message M3 additionally contains at least the third encrypted term VT3 or the fourth encrypted term VT4 or the optional second data field dat2 in plain text.

If the third message M3 contains the first encrypted term VT1, the second encrypted term VT2 or the third encrypted term VT3 or the fourth encrypted term VT4, these are decrypted in the second computer unit N. This is done for the first encrypted term VT1, which may be present, before verification of the signature term.

The third message M3 is transmitted from the first computer unit U to the second computer unit N (step 112).

In addition, authentication of the first computer unit U for the second computer unit N is ensured by the signature term, which contains the random number r, the use of which guarantees that the third message M3 has actually been sent from the first computer unit U at the present time.

In the second computer unit N, the third message M3 is decoded, decrypted, and a user certificate CertU available to the second computer unit N is then used to verify the signature term (step 113).

If temporary user identities are provided for the method, then the method described above is extended by a few method steps.

The second computer unit N must first be informed of which first computer unit U is to be allocated a new temporary identity variable TMUIN by the second computer unit N.

To this end, an old temporary identity variable TMUIO is transmitted from the first computer unit U to the second computer unit N as an additional component of the first message M1.

Once the first message M1 has been received, the second computer unit N thus knows for which first computer unit U the new temporary identity variable TMUIN is intended.

The new temporary identity variable TMUIN for the first computer unit U is then formed in the second computer unit N. This may be performed, for example, by generating a random number or by means of tables in which potential identity variables are stored. The new temporary identity variable TMUIN for the first computer unit U is used to form a fifth encrypted term VT5 in the second computer unit N by encrypting the new temporary identity variable TMUIN for the first computer unit U with the session key K using the encryption function Enc.

In this case, the second message M2 additionally contains at least the fifth encrypted term VT5. The fifth encrypted term VT5 is then decrypted in the first computer unit U. The new temporary identity variable TMUIN for the first computer unit U is now available in the first computer unit U.

So that the second computer unit N is also assured of the fact that the first computer unit U has received the new temporary identity variable TMUIN correctly, the third input variable for the first hash function h1 or for the third hash function h3 additionally contains at least the new temporary identity variable TMUIN for the first computer unit U.

Since the information for the new temporary identity variable TMUIN is contained in the signature term in this case, the third message M3 no longer contains the identity variable IMUI for the first computer unit U.

It is also possible for the new temporary identity variable TMUIN not to be integrated into the signature term, but rather for the second encrypted term VT2 to be formed by encrypting, instead of the identity variable IMUI for the first computer unit U, the new temporary identity variable TMUIN with the session key K using the encryption function Enc. In this case, the third message M3 additionally contains the second encrypted term VT2.

The hash functions used in the method, the first hash function h1, the second hash function h2 and the third hash function h3 can be produced by the same hash functions, or else by different hash functions.

Second Exemplary Embodiment

FIGS. 2A and 2B show a sketch of the execution of a second exemplary embodiment of the method.

A prerequisite for this exemplary embodiment of the method is that a dependable public user key KU for the first computer unit U in the form of a user certificate CertU is made available in the first computer unit U, and that a dependable public network key $g^s$ for the second computer unit N in the form of a network certificate CertN is made available in the second computer unit N. The public network key $g^s$ need not be available in the first computer unit U. Likewise, it is not necessary for the public user key KU to be available in the second computer unit N.

In the first computer unit U, the first random number t is generated (step 201). The generating element g of a finite group in the first computer unit U is used to form the first value $g^t$ from the first random number t (step 202).

Once the first value $g^t$ has been calculated, a first message M1 is coded, said first message containing at least the first value $g^t$ and an identity statement $id_{CA}$ for a certification computer unit CA which delivers the network certificate CertN which can be verified by the first computer unit U. The first message M1 is transmitted from the first computer unit U to the second computer unit N (step 203).

In the second computer unit N, the first message M1 is decoded.

As described in FIG. 2, a second random number r is generated in the second computer unit N (step 204). This additional method step implements an additional security aim: the assurance for the second computer unit N that a session key K described below is fresh (up to date).

In the second computer unit N, the first hash function h1 is used to form the session key K (step 205). The first input variable used for the first hash function h1 is a first term. The first term is formed by raising the first value $g^t$ to a higher power using the secret network key s.

When the second random number r is used, the first input variable for the first hash function h1 additionally contains at least the second random number r.

A response A is now formed in the second computer unit N (step 206). To form the response A, the variants described within the context of the first exemplary embodiment are provided.

Stringing together the second random number r, the network certificate CertN, the response A and an optional first data field dat1 forms the second message M2. The optional first data field dat1 is only contained in the second message M2 if this is provided in the method.

The second message M2 is coded in the second computer unit N and is transmitted to the first computer unit U (step 207).

In the first computer unit U, the second message M2 is decoded, which means that the first computer unit U has the second random number r, the response A and possibly the optional first data field dat1 available. The length of the optional first data field dat1 can be of any desired size, i.e. it is also possible for the optional first data field dat1 not to be present.

Next, the network certificate CertN contained in the second message M2 is verified in the first computer unit. Hence, the public network key $g^s$ is available in the first computer unit U.

In the first computer unit U, the session key K is now likewise formed (step 208), using the first hash function h1, which is known both in the second computer unit N and in the first computer unit U. A second input variable for the first hash function h1 for forming the session key K in the first computer unit U contains at least one second term. The second term is formed from exponentiation of the public network key $g^s$ using the first random number t. If the use of the second random number r is provided in the method for calculating the session key K, the second input variable for the first hash function h1 for forming the session key K in the first computer unit U additionally contains the second random number r.

The use of the first random number t and of the second random number r for generating the session key K ensures that the session key K is up to date, since the first random number t and the second random number r are respectively used only for one session key K in each case. This prevents reinjection of an older key as the session key K.

Once the session key K has been formed in the first computer unit U, the received response A is used to check whether the session key K formed in the first computer unit U matches the session key K which was formed in the second computer unit N (step 209).

Subject to the variants described above for forming the response A, various options are provided for checking the session key K using the response A.

To check the response A, the variants described within the context of the first exemplary embodiment are provided. This achieves the aim of key confirmation for the session key K.

As a result of the secret network key s being used for calculating the session key K in the second computer unit N, and the public network key $g^s$ being used for calculating the session key K in the first computer unit U, the second computer unit N is authenticated by the first computer unit U. This is achieved provided that it is known for the first computer unit U that the public network key $g^s$ actually belongs to the second computer unit N.

Subsequent to confirmation of the session key K by means of a check on the response A, the signature term is calculated (step 210). To this end, the third hash function h3 is used to form a fourth input variable. The third hash function h3 can, but need not, be the same hash function as the first hash function h1 and/or the second hash function h2. As a third input variable for the third hash function h3, a term is used which contains one or more variables from which it is possible to infer the session key unambiguously. In addition, the third input variable may contain the optional first data field dat1 or else an optional second data field dat2, if the use thereof is provided in the method.

Such variables are the first value $g^r$, the public network key $g^s$ and the second random number r.

It is subsequently not possible to contest the fact that the data contained in the first optional data field dat1 and in the second optional data field dat2 has been sent from the first computer unit U.

The data contained in the first optional data field dat1 and in the second optional data field dat2 may be telephone numbers, the current time or similar parameters suitable for this purpose. This information may be used as a tool for incontestable charge accounting.

A first signature function $Sig_U$ is used to form the signature term from at least the fourth input variable. To achieve a higher degree of security, the signature term may be encrypted. In this case, the signature term is encrypted with the session key K using the encryption function Enc and forms the first encrypted term VT1.

In addition, if the security aim of "anonymity of the user" is to be implemented, a second encrypted term VT2 is calculated by encrypting a user certificate CertU for the first computer unit U with the session key K using the encryption function Enc. When an optional second data field dat2 is used, a third encrypted term VT3 can be calculated in the first computer unit U by encrypting the optional second data field dat2 with the session key K using the encryption function Enc. The optional second data field dat2 may likewise be transmitted in unencrypted form.

The three encrypted terms may also be combined to form a fourth encrypted term VT4, in which the chain comprising signature term, identity variable IMUI and optional second data field dat2 is encrypted with K (step 211).

In the first computer unit U, a third message M3, containing at least the signature term and the user certificate CertU for the first computer unit U, is formed and coded. If user anonymity of the first computer unit U is to be ensured, the third message M3 contains, instead of the user certificate CertU for the first computer unit U, at least either the second encrypted term VT2 or the fourth encrypted term VT4, which contains the user certificate CertU for the first computer unit U in encrypted form, which can be decrypted only by the second computer unit N.

If the use of the optional second data field dat2 is provided, the third message M3 additionally contains at least the third encrypted term VT3 or the fourth encrypted term VT4. If the third message M3 contains the first encrypted term VT1, the second encrypted term VT2 or the third encrypted term VT3 or the fourth encrypted term VT4, these are decrypted in the second computer unit N. This is done for the first encrypted term VT1, which may be present, before verification of the signature term.

The third message M3 is transmitted from the first computer unit U to the second computer unit N (step 212).

In the second computer unit N, the third message M3 is decoded, decrypted, and a user certificate CertU available to the second computer unit N is then used to verify the signature term (step 213).

In addition, authentication of the first computer unit U for the second computer unit N is ensured by the signature term, which contains the random number r, the use of which guarantees that the third message M3 has actually been sent from the first computer unit U at the present time.

If temporary user identities are provided for the method, then the method described above is extended by a few method steps.

In the second computer unit N, a new temporary identity variable TMUIN is formed for the first computer unit U and is subsequently allocated to the first computer unit U. This may be performed by generating a random number or by means of tables in which potential identity variables are stored. The new temporary identity variable TMUIN for the first computer unit U is used to form a fifth encrypted term VT5 in the second computer unit N by encrypting the new temporary identity variable TMUIN for the first computer unit U with the session key K using the encryption function Enc.

In this case, the second message M2 additionally contains at least the fifth encrypted term VT5. The fifth encrypted term VT5 is then decrypted in the first computer unit U. The new temporary identity variable TMUIN for the first computer unit U is now available in the first computer unit U.

So that the second computer unit N is also assured of the fact that the first computer unit U has received the new temporary identity variable TMUIN correctly, the third input variable for the first hash function h1 or for the third hash function h3 additionally contains at least the new temporary identity variable TMUIN for the first computer unit U.

It is also possible for the new temporary identity variable TMUIN not to be integrated into the signature term, but rather for the second encrypted term VT2 to be formed by encrypting the new temporary identity variable TMUIN for the first computer unit U with the session key K using the encryption function Enc. In this case, the third message M3 additionally contains the second encrypted term VT2.

Third Exemplary Embodiment

Figure 3:
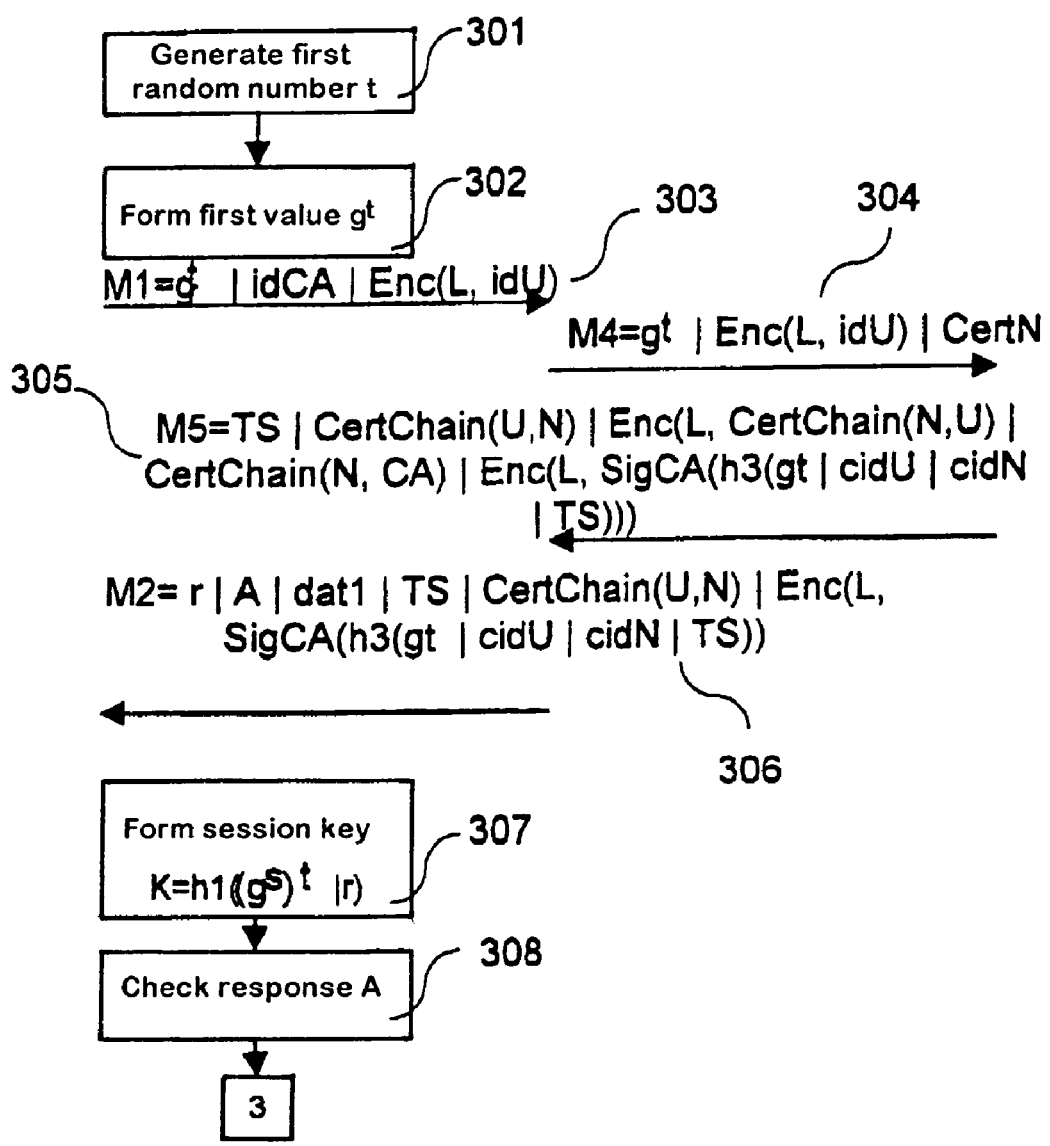
FIGS. 3A and 3B show a flowchart illustrating a third exemplary embodiment of the method with a few developments.
Figure 3B:
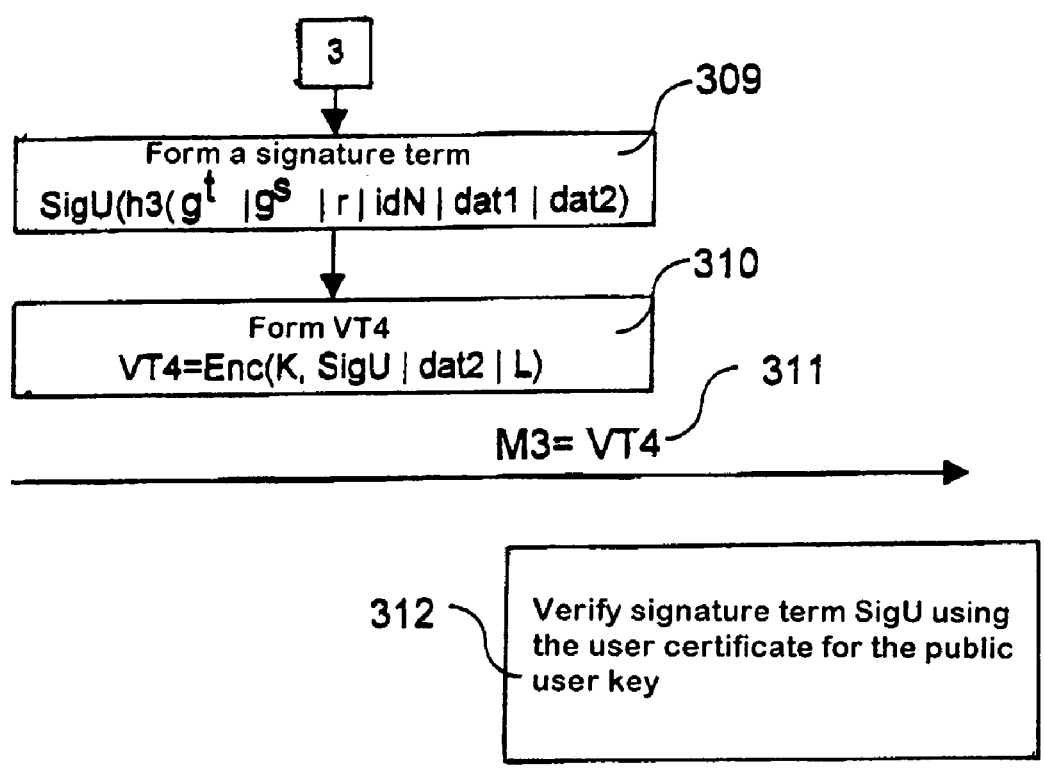

FIGS. 3A and 3B show a sketch of the execution of a third exemplary embodiment.

A prerequisite for this exemplary embodiment of the method is that no dependable public network key $g^s$ for the second computer unit N is available in the first computer unit U. A dependable public certification key cs for a certification computer unit CA is available in the first computer unit U. This means that the first computer unit U needs to "acquire" the dependable public network key $g^s$ in the form of a network certificate CertN from the certification computer unit CA. Likewise, the second computer unit N needs the dependable public user key KU in the form of a user certificate CertU from the certification computer unit CA.

In the first computer unit U, the first random number t is generated (step 301). The generating element g of a finite group in the first computer unit U is used to form the first value $g^t$ from the first random number t (step 302).

Once the first value $g^t$ has been calculated, a first message M1 is coded, said first message containing at least the first value $g^t$, an identity variable IMUI for the first computer unit U and an identity statement $id_{CA}$ for a certification computer unit CA which delivers a network certificate CertN which can be verified by the first computer unit U. This is necessary when a plurality of certification authorities with different secret certification keys are provided. If the security aim of user anonymity is to be implemented, an intermediate key L is formed in the first computer unit U before formation of the first message M1. This is done by raising the public key declaration key $g^u$ for the certification computer unit CA, which key is available in the first computer unit U, to a higher power using the first random number t. Subsequently, the identity variable IMUI for the first computer unit U is in this case encrypted with the intermediate key L using an encryption function Enc, and the result represents a fifth encrypted term VT5. The fifth encrypted term VT5 is integrated into the first message M1 instead of the identity variable IMUI for the first computer unit U. The first message M1 is transmitted from the first computer unit U to the second computer unit N (step 303).

In the second computer unit N, the first message M1 is decoded and a fourth message M4 is formed (step 304), said fourth message containing a chain comprising the certificate CertN, known to the second computer unit N, for the public network key $g^s$, the first value $g^t$ and the identity variable IMUI for the first computer unit U. If the security aim of user anonymity is to be implemented, the fifth encrypted term VT5 is coded in the fourth message M4 instead of the identity variable IMUI for the first computer unit U.

The fourth message M4 is coded in the second computer unit N and is then transmitted to the certification computer unit CA (step 304).

The fourth message M4 is decoded in the certification computer unit CA.

Next, if user anonymity is ensured, that is to say the fifth encrypted term VT5 has also been sent in the fourth message M4, the intermediate key L is calculated in the certification computer unit CA by raising the first value $g^t$ to a higher power using a secret key declaration key u for the certification computer unit CA.

The fifth encrypted term VT5 is decrypted with the intermediate key L using the encryption function Enc, as a result of which the identity variable IMUI for the first computer unit U is known in the certification computer unit CA.

In the certification computer unit CA, the user certificate CertU is then ascertained. The user certificate CertU is ascertained from a dedicated database for the certification computer unit CA, said database containing all the certificates for the computer units for which the certification computer unit CA produces certificates.

To check the validity of the network certificate CertN and of the user certificate CertU, an identity statement $id_N$ for the network computer unit N and the public network key $g^s$ also sent in the fourth message, the identity variable IMUI for the first computer unit U and also the ascertained user certificate CertU are compared with a revocation list containing invalid certificates, keys or identity variables.

The certification computer unit CA then forms three chains of certificates, a first certificate chain CertChain (U, N), a second certificate chain CertChain (N, U) and a third certificate chain CertChain (N, CA).

The first certificate chain CertChain (U, N) can be verified by the first computer unit U using the public certification key for the certification computer unit CA, which is known to the first computer unit U, and contains as last element a certificate CertN for the public key $g^s$ from the second computer unit N.

The second certificate chain CertChain (N, U) can be verified by the second computer unit N and contains as last element a certificate CertU for the public key KU from the first computer unit U.

The third certificate chain CertChain (N, CA) can be verified by the second computer unit N and contains as last element a certificate for the public verification key from the certification computer unit CA.

The first certificate chain CertChain (U, N) and the second certificate chain CertChain (N, U) can be uniquely identified by the identifiers cidU and cidN.

Next, a third term is formed from at least one chain comprising the first value $g^t$ and the identifiers cidU and cidN.

The third term is "hashed" using a fourth hash function h4, and the result of the hash function h4 is signed using a third signature function $Sig_{CA}$.

In addition, a time stamp TS is created in the certification computer unit CA. This time stamp is optionally included in the third term.

A fifth message M5 formed in the certification computer unit CA contains at least one chain comprising the signed third term and the certificate chains CertChain (U, N) and CertChain (N, U), and also optionally the time stamp TS and the certificate chain CertChain (N, CA). The signed hash value for the third term and also the certificate chain CertChain (N, U) are optionally encrypted using the intermediate key L.

The fifth message M5 is coded in the certification computer unit CA and is transmitted to the second computer unit N (step 305). Once the fifth message M5 is decoded in the second computer unit N, the signed hash value for the third term is verified, provided that it is not encrypted with L.

In the second computer unit N, a fourth term is now formed, said fourth term containing at least one chain comprising the certificate chain CertChain (U, N) and the signed hash value (optionally encrypted with the intermediate key L) for the third term.

In the second computer unit N, the first hash function h1 is used to form a session key K. A first input variable used for the first hash function h1 is a concatenation of a first term with the second random number r. The first term is formed by raising the first value $g^t$ to a higher power using a secret network key s. The second random number r is used when the intention is to implement the additional security aim of assurance for the second computer unit N that the session key K is fresh (up to date). If this security aim is not required, the second random number r is not used in the method for calculating the session key K.

In the second computer unit N, a response A is formed. For forming the response A, the variants described in the first exemplary embodiment are provided.

Stringing together the second random number r, the fourth term, the response A and also an optional first data field dat1 and the optional time stamp forms a second message M2. The optional first data field dat1 is only contained in the second message M2 if this is provided in the method.

The second message M2 is coded in the second computer unit N and is transmitted to the first computer unit U (step 306).

In the first computer unit U, the second message M2 is decoded, which means that the first computer unit U has the second random number r, the response A and also possibly the optional first data field dat1 and possibly the time stamp TS available. The length of the optional first data field dat1 can be of any desired size, i.e. it is also possible for the optional first data field dat1 not to be present.

In the first computer unit U, the session key K is now likewise formed (step 307), using the first hash function h1, which is known both to the second computer unit N and to the first computer unit U. A second input variable for the first hash function h1 for forming the session key K in the first computer unit U contains at least one second term. The second term is formed from exponentiation of a public network key $g^s$ using the first random number t. If the second random number r is provided in the method for calculating the session key K, the second input variable for the first hash function h1 for forming the session key K in the first computer unit U additionally contains the second random number r.

Once the session key K has been formed in the first computer unit U, the received response A is used to check whether the session key K formed in the first computer unit U matches the session key K which was formed in the second computer unit N (step 308).

Subject to the variants described above for forming the response A, the options described above are provided for checking the session key K using the response A.

As a result of the secret network key s being used for calculating the session key K in the second computer unit N, and the public network key $g^s$ being used for calculating the session key K in the first computer unit U, the second computer unit N is authenticated by the first computer unit U. This is achieved provided that it is known for the first computer unit U that the public network key $g^s$ actually belongs to the second computer unit N. That is achieved by U as a result of verification of the certificate chain CertChain (U, N) and also of the signed hash value for the third term. If the latter is encrypted with the intermediate key L, it needs to be decrypted using the intermediate key L before verification.

Subsequent to confirmation of the session key K by means of a check on the response A, a signature term is calculated (step 309). To this end, a third hash function h3 is used to form a fourth input variable. The third hash function h3 can, but need not, be the same hash function as the first hash function h1 and/or the second hash function h2. As a third input variable for the third hash function h3, a term is used which contains one or more variables from which it is possible to infer the session key unambiguously. In addition, the third input variable may contain the optional first data field dat1 or else an optional second data field dat2, if the use thereof is provided in the method.

Such variables are the first value $g^t$, the public network key $g^s$ and the second random number r.

It is subsequently not possible to contest the fact that the data contained in the first optional data field dat1 and in the second optional data field dat2 is sent from the first computer unit U.

The data contained in the first optional data field dat1 and in the second optional data field dat2 may be telephone numbers, the current time or similar parameters suitable for this purpose. This information may be used as a tool for incontestable charge accounting.

A first signature function $Sig_u$ is used to form the signature term from at least the fourth input variable. To achieve a higher degree of security, the signature term may be encrypted. In this case, the signature term is encrypted with the session key K using the encryption function Enc and forms the first encrypted term VT1.

When an optional second data field dat2 is used, a third encrypted term VT3 is calculated in the first computer unit U by encrypting the optional second data field dat2 with the session key K using the encryption function Enc. The optional second data field dat2 may also be transmitted in unencrypted form, that is to say in plain text.

As an alternative for forming the first and the third encrypted term VT1 and VT3, it is also possible for a fourth encrypted term VT4 to be formed by encrypting at least the chain comprising the signature term and optionally the data field dat2 and the intermediate key L using the session key K (step 310). In the first computer unit U, a third message M3 is formed and coded, said third message comprising at least the first encrypted term VT1 and, if the optional second data field dat2 is used, the third encrypted term VT3 or the optional second data field dat2 in plain text, or else comprising the fourth encrypted term VT4.

The third message M3 is transmitted from the first computer unit U to the second computer unit N (step 311).

In the second computer unit N, the third message M3 is decoded and then the first encrypted term VT1 and also possibly the third encrypted term VT3, or else the fourth encrypted term VT4, is decrypted. If parts of the message M5 have been encrypted with L, then the second computer unit N can now use the intermediate key L received in message M3 to decrypt the encrypted parts of the message M5. The second computer unit N can then verify the second certificate chain Cert (N, U) and also the signed hash value for the third term using the public verification key of CA. The user certificate CertU, which is now available to the second computer unit N, is used to verify the signature term.

In addition, authentication of the first computer unit U for the second computer unit N is ensured by the signature term in the third message M3, which contains the random number r, the use of which also guarantees that the third message M3 has actually been sent from the first computer unit U at the present time.

If temporary user identities are provided for the method, then the method described above is extended by a few method steps.

In the second computer unit N, a new temporary identity variable TMUIN is formed for the first computer unit U and is subsequently allocated to the first computer unit U. This may be performed, for example, by generating a random number or by means of tables in which potential identity variables are stored. The new temporary identity variable TMUIN for the first computer unit U is used to form a fifth encrypted term VT5 in the second computer unit N by encrypting the new temporary identity variable TMUIN for the first computer unit U with the session key K using the encryption function Enc.

In this case, the second message M2 additionally contains at least the fifth encrypted term VT5. The fifth encrypted term VT5 is then decrypted in the first computer unit U. The new temporary identity variable TMUIN for the first computer unit U is now available in the first computer unit U.

So that the second computer unit N is also assured of the fact that the first computer unit U has received the new temporary identity variable TMUIN correctly, the third input variable for the first hash function h1 or for the second hash function h2 additionally contains at least the new temporary identity variable TMUIN for the first computer unit U.

A few alternatives to the exemplary embodiments described above are illustrated below:

The invention is not restricted to a mobile radio system, and hence it is also not restricted to a user of a mobile radio system and to the network, but rather may be used in all areas in which cryptographic key interchange between two communication parties is required. This may be the case, for example, in a communication link between two computers wishing to interchange data in encrypted form. Without any restriction to the general validity, a first communication party was called the first computer unit U and a second communication party was called the second computer unit N above.

The following publications were cited as part of this document:

[1] A. Aziz, W. Diffie, "Privacy and Authentication for Wireless Local Area Networks", IEEE Personal Communications, 1994, pp. 25 to 31

[2] M. Beller, "Proposed Authentication and Key Agreement Protocol for PCS", Joint Experts Meeting on Privacy and Authentication for Personal Communications, P&A JEM 1993, 1993, pp. 1 to 11

[3] C. Carroll, Y. Frankel, Y. Tsiounis, "Efficient key distribution for slow computing devices", Conference Security & Privacy, Oakland, 1998

[4] J. Zhou, K. Lam, "Undeniable billing in mobile communications", preprint 1998

[5] U.S. Pat. No. 5,214,700

[6] DE brochures: Telesec. Telekom, Produktentwicklung Telesec beim Fernmeldeamt Siegen [Telesec. Telecom, product development Telesec at the Siegen exchange], pp. 12–13

[7] U.S. Pat. No. 5,222,140

[8] U.S. Pat. No. 5,153,919

[9] M. Beller et al, Privacy and Authentication on a Portable Communication System, IEEE Journal on Selected Areas in Communications, Vol. 11, No. 6, pp. 821–829, 1993

[10] DE 195 18 5465 C1

[11] W. Diffie, P. C. van Oorschot, M. Wiener, "Authentication and authenticated key exchanges", Designs, Codes and Cryptography, Vol. 2, pp. 107–125, 1992

We claim:

1. A method for computer-aided interchange of cryptographic keys between a first computer unit and a second computer unit, which comprises:
   in the first computer unit, forming a first value from a first random number using a generating element of a finite group;
   transmitting a first message, which at least contains the first value, from the first computer unit to the second computer unit;
   in the second computer unit, forming a session key using a first hash function; a first input variable for the first hash function including at least one first term that is formed by exponentiation of the first value using a secret network key;
   in the first computer unit, forming the session key using the first hash function; a second input variable for the first hash function including at least one second term that is formed by exponentiation of a public network key using the first random number;
   in the first computer unit, forming a fourth input variable using a given hash function selected from the group consisting of the first hash function and a second hash function; a third input variable for the given hash function including, for forming the fourth input variable, at least one variable that can be used to unambiguously infer the session key, at least part of the at least one variable being a nonpublic variable;
   in the first computer unit, using a first signature function to form a signature term from at least the fourth input variable;
   transmitting a third message, which at least includes the signature term, from the first computer unit to the second computer unit; and
   in the second computer unit, verifying the signature term.

2. The method according to claim 1, which comprises providing a key selected from the group consisting of the secret network key and the public network key as a long-service key.

3. The method according to claim 1, wherein the third input variable includes a plurality of variables that can be used to unambiguously infer the session key.

4. The method according to claim 1, wherein the at least one variable includes a feature selected from the group consisting of the first value and the public network key.

5. The method according to claim 1, which comprises:
   providing a certification computer unit that delivers a network certificate that can be verified by the first computer unit;
   providing the first message with an identity statement for the certification computer unit;
   transmitting a second message, which includes the network certificate, from the second computer unit to the first computer unit; and
   verifying the network certificate in the first computer unit.

6. The method according to claim 5, wherein:
   the second message includes a chain of network certificates that have been delivered by the certification computer unit;
   a final certificate in the chain of the network certificates is the network certificate; and
   the chain of the network certificates is verified in the first computer unit.

7. The method according to claim 5, which comprises:
   transmitting a third message, which includes a user certificate, from the first computer unit to the second computer unit;
   verifying the user certificate in the second computer unit.

8. The method according to claim 7, wherein:
   the third message includes a chain of network certificates;
   a final certificate in the chain of the network certificates is the network certificate; and
   the chain of the network certificates is verified in the second computer unit.

9. The method according to claim 1, which comprises:
   providing a certification computer unit that delivers a network certificate to the first computer unit for verification by the first computer unit;
   providing the first message with an identity variable for the first computer unit and with an identity statement for the certification computer unit;
   transmitting a fourth message, which includes the first value as an input variable, from the second computer unit to the certification computer unit;
   providing a fifth message with a feature selected from the group consisting of the network certificate, a certificate chain including a final element defining the network certificate, a user certificate, and a certificate chain including a final element defining the user certificate; and
   transmitting the fifth message from the certification computer unit to the second computer unit.

10. The method according to claim 9, which comprises:
    in the first computer unit and before forming the first message, forming an intermediate key by raising a public key declaration key to a higher power using the first random number;
    in the first computer unit and before forming the first message, forming a second encrypted term from the identity variable for the first computer unit by encrypting the identity variable with the intermediate key using an encryption function;
    providing the first message with the second encrypted term instead of the identity variable for the first computer unit; and
    providing the fourth message with the second encrypted term instead of the identity variable for the first computer unit.

11. The method according to claim 9, which comprises:
    providing the fifth message with an encrypted certificate that is encrypted with L; and selecting the encrypted certificate from the group consisting of the network certificate, the certificate chain including the final element defining the network certificate, the user certificate, and the certificate chain including the final element defining the user certificate.

12. The method according claim 9, which comprises:
in the certification computer unit, using a revocation list to check an element selected from the group consisting of the at least one variable, an identity statement for the second computer unit, the identity variable for the first computer unit, a public network key, the network certificate, and the user certificate.

13. The method according to claim 1, which comprises:
providing a fourth message with at least the public network key, the first value, an identity variable for the first computer unit that is an input variable, and an output variable from a third hash function that is signed using a second signature function;
transmitting the fourth message from the second computer unit to a certification computer unit;
verifying a first signed term in a certification computer unit;
forming a third term in the certification computer unit;
providing the third term with at least the first value, the public network key, and an identity statement for the second computer unit;
forming a hash value for the third term in the certification computer unit using a fourth hash function;
obtaining a signed hash value by signing the hash value for the third term in the certification computer unit using a third signature function;
in the certification computer unit, forming a network certificate containing at least the third term and the signed hash value for the third term;
in the certification computer unit, applying a fourth hash function to a fifth term that includes at least the identity statement for the second computer unit and a user certificate;
obtaining a second signed term by signing a hash value for the fifth term using a secret certification key and the third signature function;
providing a fifth message with at least the network certificate, the fifth term, and the second signed term;
transmitting the fifth message from the certification computer unit to the second computer unit;
verifying the network certificate and the second signed term in the second computer unit;
in the second computer unit, forming a fourth term that includes at least the public network key and the signed hash value for the third term;
transmitting a second message, which at least includes the fourth term, from the second computer unit to the first computer unit; and
verifying the network certificate in the first computer unit.

14. The method according to claim 1, which comprises:
providing a certification computer unit that delivers a network certificate to the first computer unit for verification by the first computer unit;
providing the first message with an identity variable for the first computer unit and with an identity statement for the certification computer unit;
providing a fourth message with at least one certificate for a public network key, the first value, and the identity variable for the first computer unit;
transmitting the fourth message from the second computer unit to the certification computer unit;
in the certification computer unit, forming a third term that includes an element selected from the group consisting of the public network key, and a variable that unambiguously determines the public network key;
in the certification computer unit, forming a hash value for the third term using a fourth hash function;
in the certification computer unit, obtaining a signed hash value by using a third signature function to sign the hash value for the third term;
transmitting a fifth message, containing the signed hash value for the third term, from the certification computer unit to the second computer unit;
in the second computer unit, verifying the signed hash value for the third term;
transmitting a second message, which includes the signed hash value for the third term, from the second computer unit to the first computer unit; and
in the first computer unit, verifying the signed hash value for the third term.

15. The method according to claim 14, wherein:
the certification computer unit delivers a chain of certificates to the first computer unit;
a final certificate in the chain of the certificates is the network certificate; and
the chain of the certificates can be verified in the first computer unit.

16. The method according to claim 14, wherein the third term includes an element selected from the group consisting of a public user signature key and a variable that unambiguously determines the user signature key.

17. The method according to claim 14, wherein the fifth message and the second message each have at least one chain of certificates.

18. The method according to claim 14, wherein the third term has a time stamp.

19. The method according to claim 1, which comprises:
providing a fourth message with at least the public network key, the first value, an identity variable for the first computer unit that is an input variable, and an output variable from a third hash function that is signed using a second signature function;
transmitting the fourth message from the second computer unit to a certification computer unit;
verifying a first signed term in a certification computer unit;
forming a third term in the certification computer unit;
providing the third term with at least the first value, the public network key, and an identity statement for the second computer unit;
forming a hash value for the third term in the certification computer unit using a fourth hash function;
obtaining a signed hash value by signing the hash value for the third term in the certification computer unit using a third signature function;
in the certification computer unit, forming a network certificate containing at least the third term and the signed hash value for the third term;
in the certification computer unit, applying a fourth hash function to a fifth term that includes at least the identity statement for the second computer unit, a user certificate, and a time stamp;
obtaining a second signed term by signing a hash value for the fifth term using a secret certification key and the third signature function;
providing a fifth message with at least the network certificate, the fifth term, and the second signed term;

transmitting the fifth message from the certification computer unit to the second computer unit;
verifying the network certificate and the second signed term in the second computer unit;
in the second computer unit, forming a fourth term that includes at least the public network key and the signed hash value for the third term;
transmitting a second message, which at least includes the fourth term, from the second computer unit to the first computer unit; and
verifying the network certificate in the first computer unit.

20. The method according to claim 1, which comprises:
providing the first message with at least one old temporary identity variable for the first computer unit;
in the second computer unit, after the first message has been received and before the second message is formed, forming a new temporary identity variable for the first computer unit;
forming a fifth encrypted term from the new temporary identity variable for the first computer unit by encrypting the new temporary identity variable for the first computer unit with the session key using an encryption function;
providing the second message with at least a fifth encrypted term;
decrypting the fifth encrypted term in the first computer unit after the second message has been received and before forming the fourth input variable;
providing the third input variable with at least the new temporary identity variable for the first computer unit for forming the fourth input variable; and
ensuring that the third message does not contain the identity variable for the first computer unit.

21. The method according to claim 1, which comprises:
in the second computer unit, forming a response containing information about the session key;
transmitting a second message, which includes the response, from the second computer unit to the first computer unit; and
using the response to check the session key in the first computer unit.

22. The method according to claim 1, which comprises providing the third message with an identity variable for the first computer unit.

23. The method according to claim 1, which comprises:
in the second computer unit, providing the first input variable for the first hash function with at least one second random number;
providing the second message with the second random number; and
in the first computer unit, providing the second input variable for the first hash function with at least the second random number.

24. The method according to claim 1, wherein:
the third input variable includes a plurality of variables that can be used to unambiguously infer the session key; and
the plurality of the variables include the second random number.

25. The method according to claim 1, which comprises:
before forming the third message, forming a second encrypted term in the first computer unit by using an encryption function to encrypt an identity variable for the first computer unit with the session key;
providing the third message with the second encrypted term; and
decrypting the second encrypted term in the second computer unit after the third message has been received.

26. The method according to claim 1, which comprises:
providing the second message with an optional first data field; and
providing the third input variable with the optional first data field for forming the fourth input variable.

27. The method according to claim 1, which comprises:
in the first computer unit, before forming the third message, forming a third encrypted term by encrypting at least one optional second data field with the session key using an encryption function;
providing the third message with at least the third encrypted term; and
in the second computer unit, decrypting the third encrypted term after the third message has been received.

28. The method according to claim 1, which comprises:
in the first computer unit, before forming the third message, forming a first encrypted term by at least encrypting the signature term using an encryption function;
providing the third message with the first encrypted term; and
decrypting the first encrypted term in the second computer unit after the third message has been received and before the signature term is verified.

29. The method according to claim 1, which comprises:
in the second computer unit, forming a response by using an encryption function to encrypt a constant, which is known in the second computer unit and the first computer unit, with the session key.

30. The method according to claim 29, which comprises:
in the second computer unit, forming the response by using the encryption function to also encrypt additional variables with the session key.

31. The method according to claim 1, which comprises:
in the first computer unit, checking a response by using an encryption function to encrypt a constant with the session key and comparing a result with the response.

32. The method according to claim 31, which comprises checking the response by using the encryption function to also encrypt additional variables with the session key.

33. The method according to claim 1, which comprises:
in the first computer unit, checking a response by decrypting the response with the session key using an encryption function and comparing a decrypted constant with a constant.

34. The method according to claim 33, which comprises:
in the first computer unit, checking the response by also comparing the decrypted constant with additional variables.

35. The method according to claim 1, which comprises:
forming a response in the second computer unit by applying a third hash function to an input variable that includes the session key; and
in the first computer unit, checking the response by:
applying the third hash function to the input variable that includes the session key to obtain a result, and comparing the result with the response.

36. The method according to claim 1, wherein the third message includes at least one optional second data field.

37. The method according to claim 1, which comprises providing the first computer unit as a mobile communication terminal.

38. The method according to claim 37, which comprises providing the second computer unit as an authentication unit in a mobile communication network.

39. A configuration for computer-aided interchange of cryptographic keys between a first computer unit and a second computer unit, comprising:
a first computer unit and a second computer unit configured such that:
the first computer unit forms a first value from a first random number using a generating element of a finite group,
the first computer unit transmits a first message from the first computer unit to the second computer unit, the first message includes at least the first value,
the second computer unit forms a session key using a first hash function,
a first input variable for the first hash function includes at least one first term formed by exponentiation of the first value using a secret network key,
the first computer unit forms the session key using the first hash function,
a second input variable for the first hash function includes at least one second term formed by exponentiation of a public network key using the first random number,
the first computer unit forms a fourth input variable using a given hash function selected from the group consisting of the first hash function and a second hash function,
a third input variable for the given hash function including, for forming the fourth input variable, at least one variable that can be used to unambiguously infer the session key,
at least part of the at least one variable being a nonpublic variable,
the first computer unit uses a first signature function to form a signature term from at least the fourth input variable,
the first computer unit transmits a third message to the second computer unit, the third message including at least the signature term from the first computer unit, and
the second computer unit verifies the signature term.

40. The configuration according to claim 39, wherein a key selected from the group consisting of the secret network key and the public network key is a long-service key.

41. The configuration according to claim 39, wherein the first computer unit and the second computer unit are configured such that the third input variable includes a plurality of variables that can be used to unambiguously infer the session key.

42. The configuration according to claim 39, wherein the first computer unit and the second computer unit are configured such that the at least one variable includes a feature selected from the group consisting of the first value and the public network key.

43. The configuration according to claim 39, comprising:
a certification computer unit delivering a network certificate that can be verified by the first computer unit;
the first computer unit and the second computer unit being configured such that:
the first message includes an identity statement for the certification computer unit,
the second computer unit transmits a second message to the first computer unit,
the second message includes the network certificate, and
the first computer unit verifies the network certificate.

44. The configuration according to claim 43, wherein:
the certification computer unit delivers a chain of network certificates;
the network certificate is a final certificate in the chain of network certificates;
the second message includes the chain of network certificates; and
the first computer unit verifies the chain of the network certificates.

45. The configuration according to claim 43, wherein the first computer unit and the second computer unit are configured such that:
the first computer unit transmits a third message to the second computer unit;
the third message includes a user certificate; and
the second computer unit verifies the user certificate.

46. The configuration according to claim 45, wherein:
the third message includes a chain of user certificates;
the user certificate is a final certificate in the chain of the user certificates; and
the second computer unit verifies the chain of the user certificates.

47. The configuration according to claim 39, comprising:
a certification computer unit that delivers a network certificate to the first computer unit for verification by the first computer unit;
the first computer unit, the second computer unit, and the certification computer unit being configured such that:
the first message includes an identity variable for the first computer unit and an identity statement for the certification computer unit,
the second computer unit transmits a fourth message to the certification computer unit,
the fourth message includes the first value as an input variable,
the certification computer unit transmits a fifth message to the second computer unit, and
the fifth message includes a feature selected from the group consisting of the network certificate, a certificate chain including a final element defining the network certificate, a user certificate, and a certificate chain including a final element defining the user certificate.

48. The configuration according to claim 47, wherein the first computer unit and the second computer unit are configured such that a fifth term has a time stamp.

49. The configuration according to claim 47, wherein the first computer unit and the second computer unit are configured such that a third term has a time stamp.

50. The configuration according to claim 47, wherein the first computer unit and the second computer unit are configured such that:
before forming the first message, the first computer unit forms an intermediate key by raising a public key declaration key to a higher power using a first random number;
before forming the first message, the first computer unit forms a second encrypted term from the identity variable for the first computer unit by encrypting the identity variable with an intermediate key using an encryption function;
the first message includes a second encrypted term instead of the identity variable for the first computer unit; and
the fourth message includes the second encrypted term instead of the identity variable for the first computer unit.

51. The configuration according to claim 47, wherein:
the feature, which is selected from the group consisting of the network certificate, the certificate chain including the final element defining the network certificate, the user certificate, and the certificate chain including the final element defining the user certificate, is encrypted with L in the fifth message.

52. The configuration according to claim 47, wherein the first computer unit and the second computer unit are configured such that:
the certification computer unit checks an element using a revocation list; and
the element is selected from the group consisting of the at least one variable, an identity statement for the second computer unit, an identity variable for the first computer unit, the public network key, the network certificate, and the user certificate.

53. The configuration according to claim 39, comprising:
a certification computer unit;
the first computer unit, the second computer unit, and the certification computer unit being configured such that:
the second computer unit transmits a fourth message to the certification computer unit,
the fourth message includes the public network key, the first value, an identity variable for the first computer unit provided as an input variable, and an output variable from a third hash function that is signed using a second signature function,
the certification computer unit verifies a first signed term,
the certification computer unit forms a third term,
the third term includes the first value, the public network key and an identity statement for the second computer unit,
the certification computer unit forms a hash value for the third term using a fourth hash function,
the certification computer unit uses a third signature function to sign the hash value for the third term and to thereby obtain a signed hash value,
the certification computer unit forms a network certificate containing the third term and the signed hash value for the third term,
the certification computer unit applies a fourth hash function to a fifth term containing the identity statement for the second computer unit and a user certificate,
a hash value for the fifth term is signed with a secret certification key by using the third signature function and results in a second signed term,
the certification computer unit transmits a fifth message to the second computer unit,
the fifth message includes the network certificate, the fifth term, and the second signed term,
the second computer unit verifies the network certificate and the second signed term,
the second computer unit forms a fourth term including the public network key and the signed hash value for the third term,
the second computer unit transmits a second message to the first computer unit,
the second message includes the fourth term, and
the first computer unit verifies the network certificate.

54. The configuration according to claim 39, comprising:
a certification computer unit that delivers a network certificate to the first computer unit that can be verified by the first computer unit;
the first computer unit, the second computer unit, and the certification computer unit, are configured such that:
a key selected from the group consisting of the secret network key and the public network key is a long-service key; and
the first message includes an identity variable for the first computer unit and an identity statement for the certification computer unit,
the second computer unit transmits a fourth message to the certification computer unit,
the fourth message includes at least one certificate for the public network key, the first value, and an identity variable for the first computer unit,
the certification computer unit forms a third term that includes an element selected from the group consisting of at least one public network key, and a variable that unambiguously determines the public network key,
the certification computer unit uses a fourth hash function to form a hash value for the third term,
the certification computer unit uses a third signature function to sign the hash value for the third term and to thereby obtain a signed hash value,
the certification computer unit transmits a fifth message to the second computer unit,
the fifth message includes the signed hash value for the third term,
the second computer unit verifies the signed hash value for the third term,
the second computer unit transmits a second message to the first computer unit,
the second message includes the signed hash value for the third term, and
the first computer unit verifies the signed hash value for the third term.

55. The configuration according to claim 54, wherein:
the certification computer unit delivers a chain of network certificates that can be verified by the first computer unit; and
the network certificate is a final certificate in the chain of network certificates.

56. The configuration according to claim 54, wherein the first computer unit and the second computer unit are configured such that:
the third term includes a feature selected from the group consisting of a public user signature key and a variable that unambiguously determines the public user signature key.

57. The configuration according to claim 54, wherein the first computer unit and the second computer unit are configured such that the fifth message and the second message include at least one chain of certificates.

58. The configuration according to claim 39, wherein the first computer unit and the second computer unit are configured such that:
the first message includes at least one old temporary identity variable for the first computer unit;
after the first message has been received and before the second message is formed, the second computer unit forms a new temporary identity variable for the first computer unit;
the first computer unit forms a fifth encrypted term from the new temporary identity variable for the first computer unit by encrypting the new temporary identity variable for the first computer unit with the session key using an encryption function;

the second message includes the fifth encrypted term;

after the second message has been received and before the fourth input variable is formed, the first computer unit decrypts the fifth encrypted term;

the third input variable for the given hash function includes the new temporary identity variable for the first computer unit for forming the fourth input variable; and the third message does not include an identity variable for the first computer unit.

59. The configuration according to claim 39, wherein the first computer unit and the second computer unit are configured such that:

the second computer unit forms a response including information about the session key;

the second computer unit transmits a second message to the first computer unit;

the second message includes the response; and the first computer unit checks the session key using the response.

60. The configuration according to claim 39, wherein the first computer unit and the second computer unit are configured such that the third message includes an identity variable for the first computer unit.

61. The configuration according to claim 39, wherein the first computer unit and the second computer unit are configured such that:

in the second computer unit, the first input variable for the first hash function includes a second random number;

the second message includes the second random number; and in the first computer unit, the second input variable for the first hash function includes the second random number.

62. The configuration according to claim 39, wherein the first computer unit and the second computer unit are configured such that:

the third input variable includes a plurality of variables that can be used to unambiguously infer the session key; and the plurality of the variables include the second random number.

63. The configuration according to claim 39, wherein the first computer unit and the second computer unit are configured such that:

before the third message is formed, the first computer unit forms a second encrypted term from the identity variable for the first computer unit by using an encryption function to encrypt at least the identity variable with the session key;

the third message includes the second encrypted term; and the second computer unit decrypts the second encrypted term after the third message has been received.

64. The configuration according to claim 39, wherein the first computer unit and the second computer unit are configured such that:

the second message includes an optional first data field; and the third input variable for the given hash function includes the optional first data field for forming the fourth input variable.

65. The configuration according to claim 39, wherein the first computer unit and the second computer unit are configured such that:

before the third message is formed, the first computer unit forms a third encrypted term by encrypting an optional second data field with the session key using an encryption function;

the third message includes the third encrypted term; and after the third message has been received, the second computer unit decrypts the third encrypted term.

66. The configuration according to claim 39, wherein the first computer unit and the second computer unit are configured such that:

before the third message is formed, the first computer unit forms a first encrypted term by at least encrypting the signature term using an encryption function;

the third message includes the first encrypted term; and after the third message has been received and before the signal term is verified, the second computer unit decrypts the first encrypted term.

67. The configuration according to claim 39, wherein the first computer unit and the second computer unit are configured such that:

the second computer unit forms a response by using an encryption function to encrypt a constant, which is known in the first compute unit and the second computer unit, with the session key.

68. The configuration according to claim 67, wherein the response is formed by also encrypting additional variables, which are known in the first compute unit and the second computer unit, with the session key.

69. The configuration according to claim 67, wherein the first computer unit is configured to check the response by:

using the encryption function to encrypt a constant with the session key to obtain a result; and comparing the result with the response.

70. The configuration according to claim 69, wherein the first computer unit is configured to check the response by also encrypting additional variables with the session key to obtain the result.

71. The configuration according to claim 67, wherein the first computer unit and the second computer unit are configured such that:

the first computer unit checks the response by:

decrypting the response with the session key using an encryption function to obtain a decrypted constant, and comparing the decrypted constant with a constant.

72. The configuration according to claim 67, wherein the first computer unit and the second computer unit are configured such that:

the first computer unit checks the response by:

decrypting the response with the session key using an encryption function to obtain a decrypted constant, and comparing the decrypted constant an additional variables with a constant.

73. The configuration according to claim 39, wherein the first computer unit and the second computer unit are configured such that:

the second computer unit forms a response by applying a third hash function to an input variable that includes the session key; and the first computer unit checks the response by:

applying the third hash function to an input variable, which includes the session key, to obtain a result, and comparing the result with the response.

74. The configuration according to claim 39, wherein the first computer unit and the second computer unit are configured such that the third message includes at least one optional second data field.

75. The configuration according to claim 39, wherein the first computer unit is a mobile communication terminal.

76. The configuration according to claim 75, wherein the second computer unit is an authentication unit in a mobile communication network.

77. The configuration according to claim 39, wherein the second computer unit is an authentication unit in a mobile communication network.

* * * * *